(12) United States Patent
O'Reilly (10) Patent No.: US 12,141,221 B2
(45) Date of Patent: Nov. 12, 2024

(54) BROWSER APPLICATION EXTENSION FOR PAYLOAD DETECTION

(71) Applicant: Bank of America Corporation, Charlotte, NC (US)

(72) Inventor: Nicholas Walter O'Reilly, Dallas, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/866,960

(22) Filed: Jul. 18, 2022

(65) Prior Publication Data

US 2024/0020347 A1 Jan. 18, 2024

(51) Int. Cl.
*G06F 16/957* (2019.01)
*G06F 16/958* (2019.01)

(52) U.S. Cl.
CPC ...... *G06F 16/9574* (2019.01); *G06F 16/9577* (2019.01); *G06F 16/958* (2019.01)

(58) Field of Classification Search
CPC . G06F 16/9574; G06F 16/9577; G06F 16/958
USPC ........................................................ 715/234
See application file for complete search history.

(56) References Cited

U.S. PATENT DOCUMENTS

| | | | |
|---|---|---|---|
| 8,738,733 B1 * | 5/2014 | Walters | G06F 16/9535 709/228 |
| 9,811,248 B1 * | 11/2017 | Berg | G06F 3/0481 |
| 10,223,549 B2 | 3/2019 | Banerjee | |
| 10,715,542 B1 * | 7/2020 | Wei | G06F 16/958 |
| 10,831,856 B1 * | 11/2020 | Tkach | G06F 16/958 |
| 10,868,827 B2 | 12/2020 | Davidson et al. | |
| 10,902,081 B1 * | 1/2021 | Gassner | G06Q 10/103 |
| 11,240,261 B2 | 2/2022 | Lowry et al. | |
| 2010/0228737 A1 * | 9/2010 | Riemers | G06F 16/9574 707/747 |
| 2011/0283359 A1 * | 11/2011 | Prince | H04L 67/146 726/23 |

(Continued)

OTHER PUBLICATIONS

7. Redirection; Mar. 19, 2019; www.httpwatch.com/httpgallery/redirection; pp. 1-2.*

(Continued)

*Primary Examiner* — Asher D Kells
(74) *Attorney, Agent, or Firm* — Moore & Van Allen PLLC; Lauren M. Stokes (57) ABSTRACT

Content transfers over the network may be monitored by various systems in order to prevent malicious activity, viruses, other possible risks to computing devices, to confirm the integrity of the transfer, and/or to enforce policies implemented by an organization or user or other entity. To provide accurate and granular information about the content being transferred, an application extension, such as a browser extension, may be implemented to detect content transfers and to determine and store associated data. This data may include redirects, hashes, content file characteristics (name, size, creation date, extension, etc.), user identifier, source and destination information, and the like and/or combinations thereof. Using this information, an analysis system may evaluate the content transfer and the content and determine whether any actions are to be taken with respect to the user, the content, and/or the device.

20 Claims, 7 Drawing Sheets

(56) References Cited

U.S. PATENT DOCUMENTS

| | | | |
|---|---|---|---|
| 2013/0086677 A1* | 4/2013 | Ma | G06F 21/50 726/22 |
| 2015/0026551 A1* | 1/2015 | Schmidt | H04L 63/06 715/205 |
| 2019/0102545 A1* | 4/2019 | Wang | G06F 8/61 |
| 2020/0145385 A1* | 5/2020 | Chauhan | H04L 63/0281 |
| 2020/0250316 A1 | 8/2020 | Rickerd et al. | |
| 2021/0271804 A1 | 9/2021 | Cowley et al. | |
| 2021/0357447 A1* | 11/2021 | McKenzie | G06F 16/638 |
| 2021/0390470 A1* | 12/2021 | Clearwater | G06Q 10/0635 |
| 2022/0150220 A1* | 5/2022 | Verheyen | H04L 9/50 |
| 2022/0417223 A1* | 12/2022 | Prasad | H04L 63/0414 |

OTHER PUBLICATIONS

Capturing form loading time using HTTPwatch tool; Jul. 10, 2022; Qxf2 BLOG; pp. 1-2.*

Extension; Jun. 21, 1997; Free On-Line Dictionary of Computing; pp. 1-2.*

* cited by examiner

BROWSER APPLICATION EXTENSION FOR PAYLOAD DETECTION

BACKGROUND

Aspects of the disclosure relate to electrical computers, systems, networks, and devices for detecting payloads in network transmissions and determining and storing data associated with those detected payloads.

In some existing systems, browser applications provide a mechanism for uploading and downloading information. For example, web browsers allow users to upload information such as documents, images, audio files, and the like to a website or server as well as to download content from those sites. In various circumstances, organizations, users and/or systems may wish to detect and track such transmission and/or reception of data. However, oftentimes, the detection and tracking is performed through a proxy system that is unable to detect and trace information about the upload or download other than an identification of the source and destination of the request and of the content being downloaded or uploaded. For example, existing systems that use proxies to detect uploads and downloads may be unable to determine information related to the downloads and uploads such as redirect data, user agent information, and the like. Additionally, determining content transfer data and attributes by the underlying operating system or device might also not provide accurate information if the content or content attributes are modified between receipt by the browser application and storage by the device and operating system.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

According to some aspects, a browser application extension is used to detect and track, at the endpoint, information about network transmissions such as uploads and downloads. By detecting and tracking uploads and downloads at the endpoint, additional and/or more accurate information may be determined and stored. For example, an endpoint application extension may be configured to detect and store navigation information (e.g., redirect number, redirection sources, etc.) that leads to a download or upload. In another example, an endpoint application extension may be configured to determine and store a user or other agent identification associated with a network transmission. In still other examples, such determinable information may include an origination hash for an upload, a timestamp of an upload or download request, file information such as size, name, extension, destination and source IP addresses, URL, MAC address, and the like and/or combinations thereof.

According to aspects, a browser application extension allows for the determining of upload and download and other transmission information prior to possible changes made by intermediary network devices such as proxies, routers, network address translation (NAT) nodes and the like. Accordingly, the determined information such as content hashes, source and destination address information, file information, timestamps, and the like may be more accurate given that the information is determined at the source or destination endpoint of the transmission. The browser extension may also capture information that is not known to an underlying operating system or device.

According to further aspects, a browser application extension at the source or destination endpoint may determine and store additional data that may be defined by a system or organization or user. In one example, an organization may define new fields or metadata that it wishes to determine and track for transmissions such as uploads and/or downloads. Rather than requiring a proxy or network node to modify its detection policies and configuration, such detection and tracking may be implemented and defined at the endpoint level.

According to another aspect, information detected and stored by the application extension may be transmitted to an analysis server that is configured to identify various issues with content transmissions. For example, the analysis server may log received content transfer information and may further be configured to detect malicious activity or corruption in the content being sent or received. In another example, the analysis server may be configured to determine whether the download or upload is complete (e.g., data loss prevention, transfer/content integrity).

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Network communication integrity and security is important in numerous contexts. When downloading or uploading content, a user, organization, system or other entity may wish to confirm that the content is not corrupted, is successfully transferred in its entirety, does not originate from a malicious entity, and/or does not include malicious code. In some instances, the information associated with uploaded or downloaded content may be obscured or modified by various network entities in a transmission path. Accordingly, determining content information at a source or destination endpoint using a content browser extension may allow a system to collect more accurate data with which to evaluate content integrity and security.

Additionally, an application or application extension on the endpoint may allow a device or system to determine information that is otherwise unavailable to unknown to other devices along a network path. For example, the application or application extension at the endpoint may be able to determine and identify and log prior sites or pages that lead to the page or site containing the content to be downloaded. Similarly, the application or extension may be able to determine and track the prior sites or pages leading to a page or site through which content is to be uploaded.

An analysis and/or log server may receive the data associated with the detected payloads (e.g., uploaded or downloaded content) from the application extension and subsequently evaluate the data to identify possible issues. Such issues may include malicious code, errors in the data, non-matching content (e.g., between source and destination), policy violations, and the like and/or combinations thereof. The analysis and/or log server, based on this analysis, may provide instructions to a source or destination device relating to downloaded or uploaded content.

These and various other arrangements will be discussed more fully below.

Figure 1A:
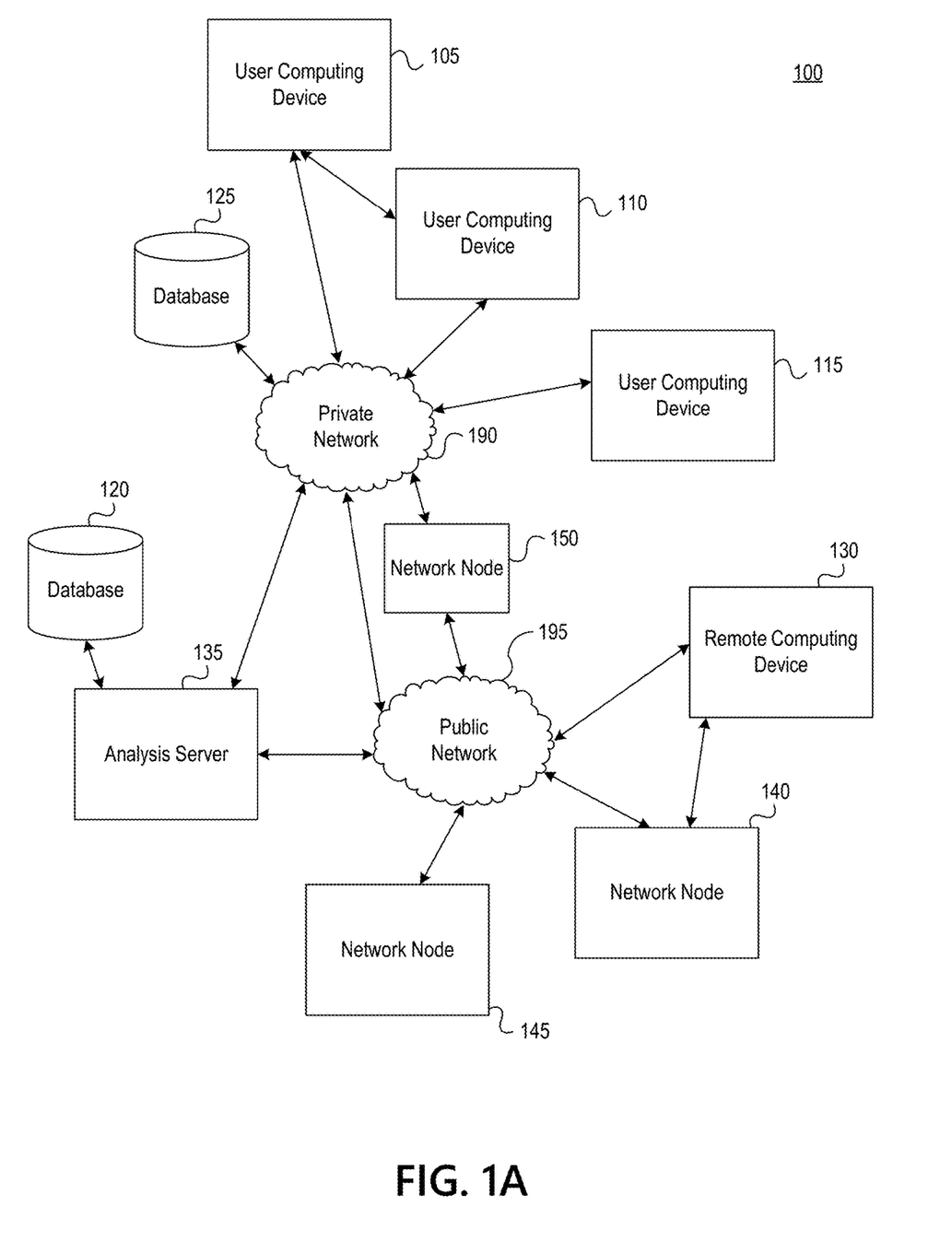
FIGS. 1A and 1B depict illustrative computing environments for implementing payload data detection and processing in accordance with one or more aspects described herein.
Figure 1B:
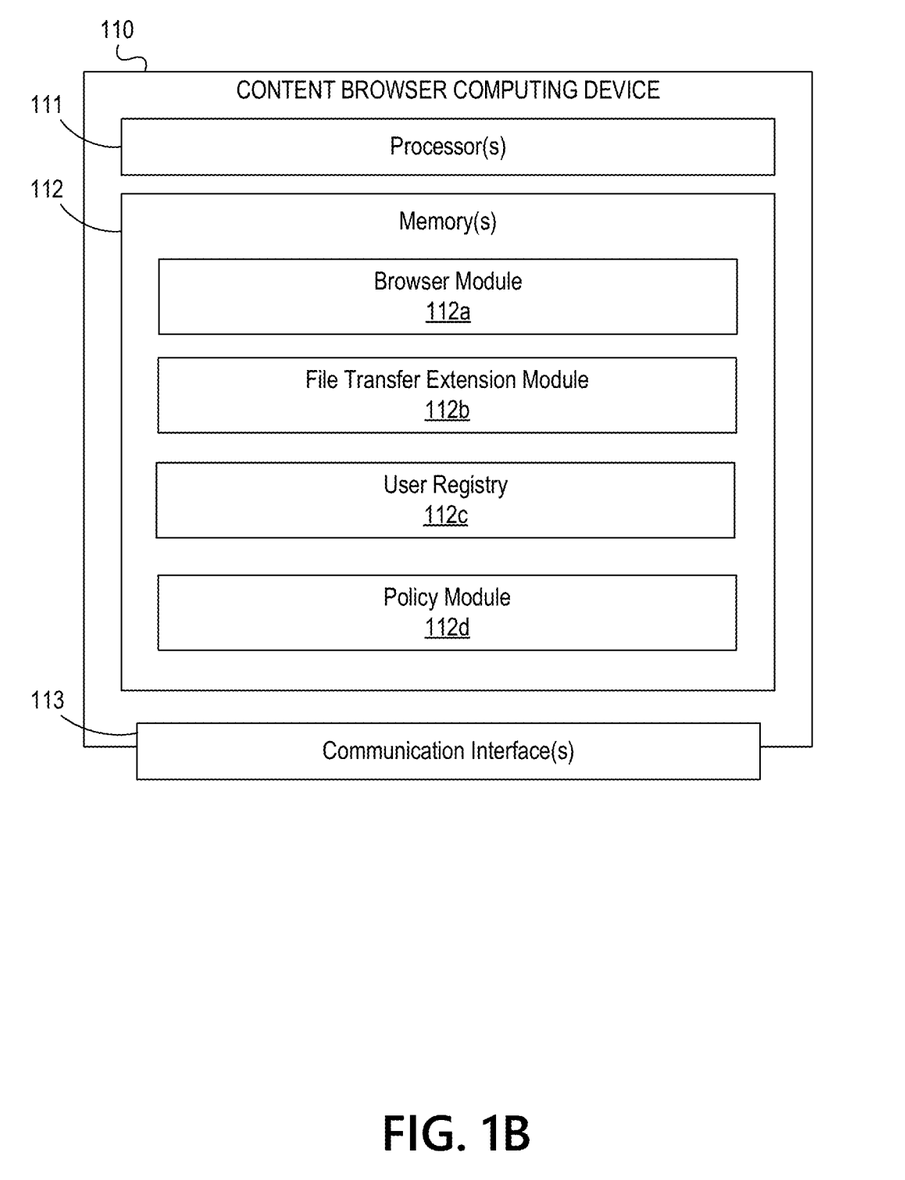

FIGS. 1A-1B depict illustrative computing environments for endpoint content transmission detection functions in accordance with one or more aspects described herein. Referring to FIG. 1A, computing environment 100 may include one or more computing and electronic devices and/or other computing systems connected through one or more networks. For example, computing environment 100 may include user computing devices 105, 110, 115, databases 120 and 125, a remote computing device or system 130, and an analysis server 135. Devices 105, 110, 115, 120, 125, 130, 135 may include laptops, mobile phones, smartphones, tablets. Such devices may also include processors and communication interfaces with which the devices may communicate with each other and/or other devices. While the illustration of FIG. 1A includes particular numbers of devices, any number of systems or devices may be used without departing from the aspects described herein.

As mentioned above, computing environment 100 also may include one or more networks, which may interconnect one or more of computing devices 105, 110, 115, 130, databases 120 and 125, and analysis server 135. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular user, location (e.g., home, office), and/or organization (e.g., a corporation, financial institution, educational institution, governmental institution, or the like) and may interconnect one or more computing devices associated with the user, location and/or organization. For example, private network 190 may be a user-configured home network that interconnects one or more of the devices at the user's home or otherwise associated with the user. This may include computing devices 105, 110, and 115 as shown in FIG. 1A. In one or more examples, a device such as device 105 may connect to the private network 190 through another device such as computing device 110. Additionally, or alternatively, devices may connect directly to one another using various communication technologies and protocols including Bluetooth, NFC, infrared and the like. For example, device 105 may be connected to computing device 110 using Bluetooth. The private network 190 may further provide access to a public network such as the Internet or another wide-area network (WAN) and devices external to the private network 190, including remote computing device 120. In some arrangements, the analysis server 135 may be part of the private network 190 and the private network may be associated with an organization or business or the like. In other arrangements, the analysis server 135 and one or more of databases 125 and 130 may be located outside of private network 190.

In some arrangements, user computing devices 105, 110, 115 may be configured to access a public network such as network 195 and further to interact with one or more devices or systems connected to the public network 195. For example, devices 105, 110, 115 may send and/or receive information and other data to and from remote computing device 130. This content or data may include documents, images, audio, video, software, other executable code, and the like and/or combinations thereof. In order to interact with remote computing device 130, computing devices 105, 110, 115 may store and execute a content browsing application such as a web browser or file transfer protocol (FTP) client.

Additionally, computing environment 100 may further include one or more network entities or nodes 140 and 145 within public network 195. For example, these network entities or nodes may be proxy servers, repeater nodes, firewalls, filters, NAT devices, routers and the like. Such devices may be configured to modify information being transmitted over a network path of which it is a part. In a particular example, network node 140 may be a router that exists along a path between private network 190 and remote computing device 130. Accordingly, communications to and from remote computing device 130 may pass through network node 140. Network node 140 may be configured to modify information within communication packets transmitted to and/or from remote computing device 130. In one example, network node 140 may act as a proxy, which routes information to remote computing device 130 without exposing a destination address of the remote computing device 130. Instead, network node 140 may use its own address to receive information directed to remote computing device 130, and subsequently route the information to the destination device 130.

Computing environment 100 may further include an intermediate network device such as node 150 within private network 190. The network node 150 may be used to protect devices 105, 110, 115 from being exposed to external attacks by hiding identifying information (e.g., IP addresses, names, etc.) of devices 105, 110, 115. Additionally, node 150 may be configured to provide access control (e.g., controlling access to the public network 195 or nodes within public network 195) as well as content caching. In some arrangements, network node 150 may function similarly to network node 140. That is, network node 150 may serve as a proxy server for communications to and from private network 195. Accordingly, transmissions to and from network 195 may identify the address of proxy server 150 as the source or destination rather than the address of devices 105, 110 and/or 115. Because of this addressing, the source or destination information provided in a communication packet detected at the proxy server 150 might not correspond to the actual destination or source device. More specifically, the source or destination address may be the address of proxy server 150, rather than the address of the true destination device such as the IP address of device 105 or 110. Other information (e.g., timestamps, filenames, file formats, hashes, etc.) stored in or otherwise associated with communication packets received or transmitted by node 150 may similarly be obscured due to the proxy functionality of node 150.

Referring to FIG. 1B, a computing device configured to transmit or receive data such as content uploads or downloads may include one or more processors 111, memory 112, and communication interface 113. The device illustrated in FIG. 1B may, for example, correspond to computing device 105. A data bus may interconnect processor(s) 111, memory 112, and communication interface 113. Communication interface 113 may be a network interface configured to support communication between service provider platform 110 and one or more networks (e.g., private network 190, public network 195, or the like). Memory 112 may include one or more program modules having instructions that when executed by processor(s) 111 cause service provider platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of service provider platform 110 and/or by different computing devices that may form and/or otherwise make up service provider platform 110.

For example, memory 112 may have, store and/or include a browser module 112a. Browser module 112a may be configured to communicate through network 190 and/or network 195 according to various protocols for requesting, receiving and/or transmitting content. Browser module 112a may include security policies, encryption protocols, virus detection functionality and the like. Browser module 112a may also be configured to execute and interact with a variety of browser extensions. Extensions generally refer to software modules that seek to modify or otherwise customize the way in which a browser operates. For example, browser module 112a may include or otherwise interface with a file transfer extension module 112b configured to detect uploads and downloads executed or otherwise performed through the browser module 112a. File transfer extension module 112b may be further configured to store information about the upload or download and/or the content which is being uploaded or downloaded. For example, file transfer extension module 112b may store information about sites or pages visited by a user prior to detecting a download or upload request. This may provide a way for a system or organization to identify redirects, thereby linking a download or upload request with a page or site through which a navigating user was redirected to execute the upload or download. In one example, the user may be browsing a first site with a download link. That download link, however, may redirect the user to a second site which automatically executes the download. An observer outside of the browser module 112a might only recognize the second site as the source of the download. However, a system or organization or user might wish to know the identity of the first site which redirected the user to the second site. This information may help to further trace or otherwise detect malicious actors or malicious content (e.g., if the first site is known to be associated with malicious actors). In other examples, identifying the first (or prior) site may provide more accurate source information (e.g., the identity of the creator of the downloaded content). Any number of prior sites leading to the download or upload request may be stored in order to provide even more granular information relating to content uploads and downloads.

User registry 112c may be configured to store user information for the computing device. For example, user registry 112c may store information for users authorized to use the computing device. This information may include identification information, contact information, access credentials (e.g., passwords, passcodes, cryptographic keys, two-factor authentication enrollment and information etc.). In some examples, the user information in registry 112c may be associated with upload and download information stored by browser module 112a via file transfer extension module 112b. Accordingly, the computing device may be able to differentiate between download and upload activity of one user versus a different user.

The computing device instructions may further provide a policy module 112d which may be configured to enforce limitations or other restrictions on uses of the computing device or applications provided thereon. In one example, policy module 112d may store access and use policies for each user defined in user registry 112c. In some examples, policy module 112d may also store a general policy for users not specifically defined in registry 112c. Policy module 112d may define security policies such as whether a user may access certain information, sites, devices or content, encryption policies specifying whether communications by the user must be encrypted and identifying a type of encryption protocol required, data storage policies identifying the type of information that is to be stored when the corresponding user uploads or downloads content, access limits including whether the user is allowed to download content, upload content, use certain applications and the like.

Figure 2:
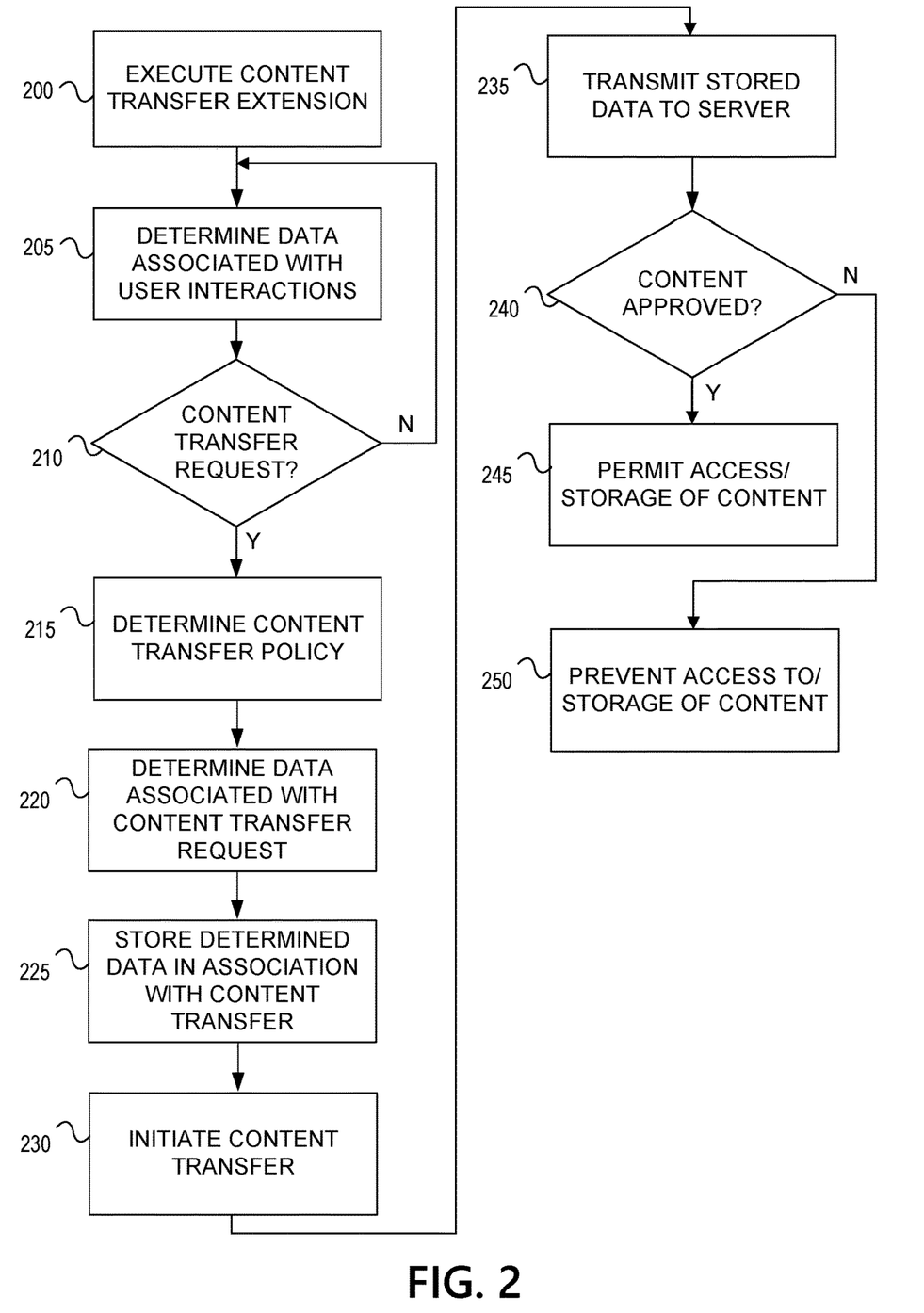
FIG. 2 is a flowchart illustrating an example process for using a browser extension to detect payloads and determine and store associated data according to one or more aspects described herein.

FIG. 2 is a flowchart illustrating a process for detecting content transfers in a browser environment and storing data associated with the content transfer. In step 200, a browser application executing on a computing device may activate or execute a browser application extension such as a content transfer extension. The extension may be computer-executable code configured to modify (e.g., add to, change, restrict) functionality of the browser application. In some arrangements, the browser extension might not be necessary for the browser application to function. In some systems, however, an organization, user, company or the like may require certain extensions and applications. Accordingly, those organizations or individuals may require that a content transfer extension be executed every time the browser application is executed. This may be enforced by a security or software policy installed in the computing device. For example, the computing device may be required to automatically execute the extension(s) whenever the browser application is activated. In some examples, the browser application may specify the extensions that are to be executed at run-time (of the browser application) and execute those extensions automatically upon start-up.

In step 205, the browser application may receive user interactions such as user input and store data associated with those user interactions. User input may include user-entered characters, mouse clicks, selections, audio input, video input, biometric input, and the like. The browser application, through the content transfer extension, may automatically store the user input itself and/or data associated with the user input. For example, if the user input is a selection of a link in a webpage, the content transfer extension may store the URL or other identifier of the link in a log or other data file. In some cases, the content transfer extension might also store the identifier of the current webpage or site. In another example, if the user input corresponds to characters entered by the user, the content transfer extension may store those entered characters in a log. Data associated with the user interactions might further include timestamps, a user identifier, information or identification of the browser application being used and the like. The browser application extension may store data associated with user interactions up to a certain limit. The limit may be defined based on a number of pages or sites visited, an amount of time, an amount of data stored, and the like. In one example, data might only be stored for the most recent five pages or sites visited. In another example, data might only be stored for the last 30 minutes. In still another example, data might only be stored up to 50 MB. Various limits and/or combinations of limits may be set according to an individual's or organization's preferences or needs. In some examples, the limits may be set based on an organizational policy.

In step 210, the browser application, through the content transfer extension, may determine if a user interaction corresponds to a content transfer request. A content transfer request may be, for example, a HTTP get command or HTTP put command corresponding to downloads and uploads, respectively. The content transfer extension may be configured to detect a variety of commands, scripts, code, and the like that correspond to content transfer requests such as downloads and uploads. If the user interaction is not a content transfer request, the browser application and extension may continue to monitor and store data associated with user interactions in step 205. If, however, the user interaction does correspond to a content transfer request, the browser application, using the content transfer extension, may determine a content transfer policy in step 215. A content transfer policy may define various parameters, including permissions and restrictions for content transfer. In some cases, the content transfer policy may identify the types of content that may be downloaded or uploaded, a size of the content that may be downloaded or uploaded, a permissible source or destination of content to be downloaded or uploaded, and the like. In further examples, the content transfer policy may also define the type of data that must be logged when a content transfer occurs and/or a type of encryption that must be used for the content transfer. The content transfer policy may be computing device specific, user specific, organization specific, department specific, job specific, and the like and/or combinations thereof. In one example, each user may have their own defined content transfer policy. In other examples, a content transfer policy may be unique to a security clearance level or position level at an organization.

Upon determining the content transfer policy, the browser application, using the content transfer extension, may determine and store content transfer data in steps 220 and 225, respectively. This may be performed in conjunction with initiating the content transfer in step 230. For example, some data such as file characteristics (size, time of creation, format, file extension, encryption) may be stored while the file is being downloaded. Other types of data might be determined and stored upon the content being fully transferred. For example, a hash of the content to be downloaded might only be calculated upon downloading the full content. However, for uploads, a hash might be calculated even prior to initiating the upload to the destination location. By storing these content attributes and information at a content transfer endpoint (e.g., the source or destination), various analyses may be conducted more accurately. For example, a hash generated at the point of upload may be compared to a hash at the download endpoint (or at an intermediary point such as a proxy server to the like) to determine whether the full content item has been successfully transferred. A hash comparison (or a comparison of other content attributes) may also be used to determine whether any alterations were made to the content along the network path. In still other examples, information or other data associated with the content transfer may include redirect information. Redirect information generally refers to one or more prior sites or pages which redirected the user to the content transfer request. Such information may allow a system or organization to trace an origin of a content transfer request. This information may be helpful in various situations, such as when malicious code is detected in the content. If only the direct source of the content were known, a user or organization might not be able to determine which site or page redirected the user to that particular source of the content, thereby obscuring potentially relevant information (e.g., a true source or owner of the content). Additionally, or alternatively, a number of redirects (i.e., a redirect count) may also be detected and stored.

Other types of information associated with the content transfer may include a user name of the individual initiating the content request, a user agent (e.g., a browser client) used to perform the content transfer, source and/or destination address information, and the like. Further, similar to redirect information, the browser extension might also store the identity of a specified number of prior pages or sites visited by the user before the content request was initiated. This may allow a system or organization to further trace a content transfer in various circumstances, such as when malicious activity or code is detected.

As noted herein, the use of information detected at the download or upload endpoint and at the browser application-layer allows for more accurate detection of content transfer attributes and information. For example, a proxy server or other intermediate network node along a content transfer path may modify some aspect of the content or content attributes, thereby obscuring the original information and content data. This may make it more difficult to diagnose issues such as malware and data corruption or partial transfer. In some arrangements, the browser extension may further cause the computing device to transmit the detected and stored data to an analysis server or log server for storage and/or analysis in step 235. Additionally, the computing device may, in some configurations, wait for the server to confirm that downloaded content may be safely accessed before allowing the user to interact with the download in steps 240 and 245. For example, if the content is determined to be not safe or restricted, the computing device may prevent storage and access to the downloaded content in step 250 by, in some arrangements, deleting the content automatically.

For uploads, the computing device may also perform various functions based on a response from the analysis server. For example, the browser extension may wait for confirmation from the analysis server that an upload was successfully (e.g., completely) transmitted. If not, the browser extension may automatically retry the upload. Additionally, the browser extension may instruct the underlying operating system and computing device to disallow deletion of the upload content until confirmation of successful transfer has been received from the analysis server and/or the upload destination device. In some cases, a successful transfer may be determined based on a hash of the content at the upload source matching a hash of the content at the upload destination. A variety of functions may be implemented by the computing device based on analysis results from an analysis or log server as desired or needed.

Figure 3A:
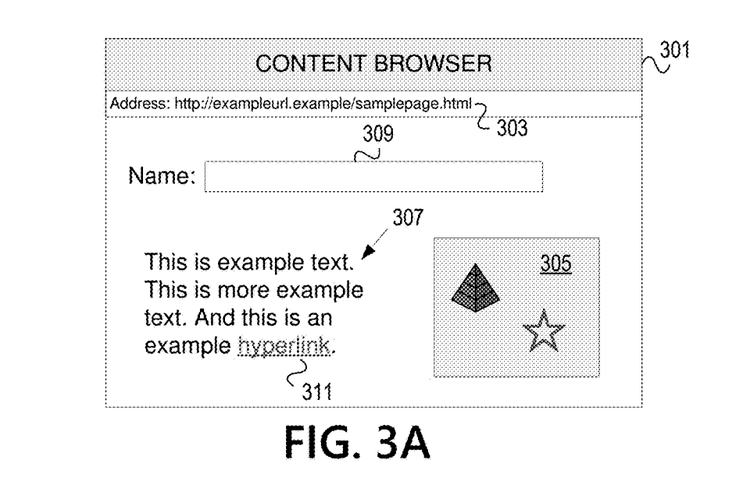
FIGS. 3A-3C illustrate example browser interfaces according to one or more aspects described herein.
Figure 3B:
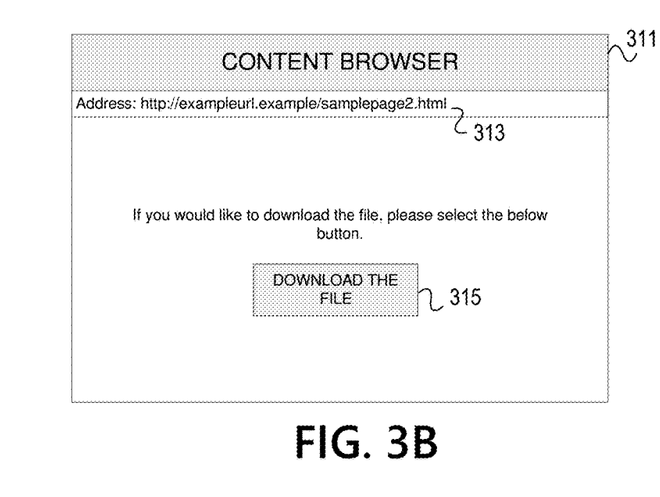
Figure 3C:
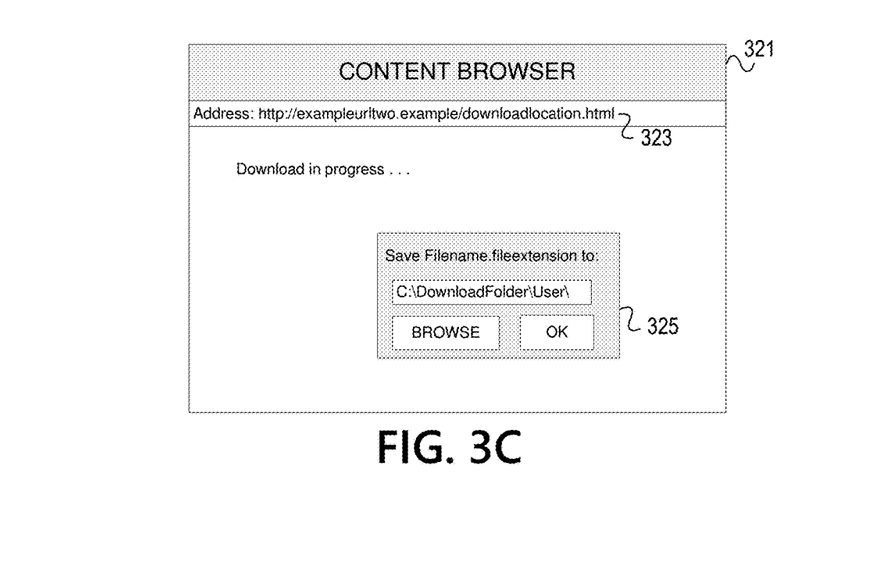

FIGS. 3A-3C illustrate a sequence of browser interfaces showing page navigation and redirection. In FIG. 3A, browser interface 301 displays a first webpage or other content page identified by an address or URL 303. The content page may include images 305, text 307, user input element 309, and active link 311. Active links may be user-selectable elements of the content page that executes code, such as code for navigating to a different page or site, and/or activating some function such as a download or upload. In some arrangements, one or more of images 305 may have embedded links. Accordingly, selecting an image may cause execution of a function such as navigating to another page or site or initiating an upload or download. As discussed herein, a browser extension executing in conjunction with a browser may store data associated with user interactions such as a user selecting an active link 311 or typing (otherwise entering) characters into a user input element 309.

FIG. 3B illustrates a second browser interface 311 that may be displayed by a browser application after a user has selected link 311 in interface 301, thereby causing the browser to navigate to a new page or site 313. A browser extension may store this navigation sequence, including the identity of the prior page or site 303 (FIG. 3A) and the identity of the destination page or site 313. Interface 311 of page 313 may include various elements including a button or active interface element 315 allowing a user to download a file such as a document. In some cases, the interface element 315 may simply identify the action (e.g., HTTP GET command) along with the filename of the content to be downloaded. The file may originate from the same site or server as the page 313. However, in other circumstances, interface element 315 may redirect the user to another site or server for downloading the specified file. For example, element 315 may specify an address of another server or network location hosting the desired file. This function of automatically navigating a user from one site or page to another site or page may be generally referred to as a redirect. Accordingly, in a redirect, the user may intend to access a file or site at a first network location, but is actually and automatically navigated or moved to a different site or network location. In one example, a redirect may refer to a function where a user navigates to a second site from a first site, but is then automatically navigated (i.e., directed) to a third site without the user providing any input or direction. In some arrangements, having a browser extension perform such tracking is preferable as the browser extension is the closest to the user or endpoint from a network communication perspective. A proxy server or the underlying operating system of the computing device might not be able to detect such granularity in a user's interactions with the browser.

FIG. 3C illustrates a download interface after a user has selected interface element 315 (FIG. 3B), resulting in a redirection to a third site 323. As illustrated, third site 323 is provided at a different domain than the second page or site 313 (FIG. 3B). In this interface 321, a user is prompted to save the file to be downloaded. This prompt 325 may allow the user to specify a desired storage location, and may be generated (e.g., as a separate window or separately controllable user interface element) by the underlying operating system, the browser application and/or the browser extension. The browser extension may, through the navigation and redirections between the interfaces 301, 311 and 321, detect and store user interaction information including the sequence of pages and sites preceding the download. This allows a system or user to trace a sequence of steps or pages through which the download was executed otherwise invoked. Although the sequence of interfaces of FIGS. 3A-3C illustrates a download function, an upload function may similarly be invoked based on navigating a series of sites or pages and/or redirections.

Figure 4:
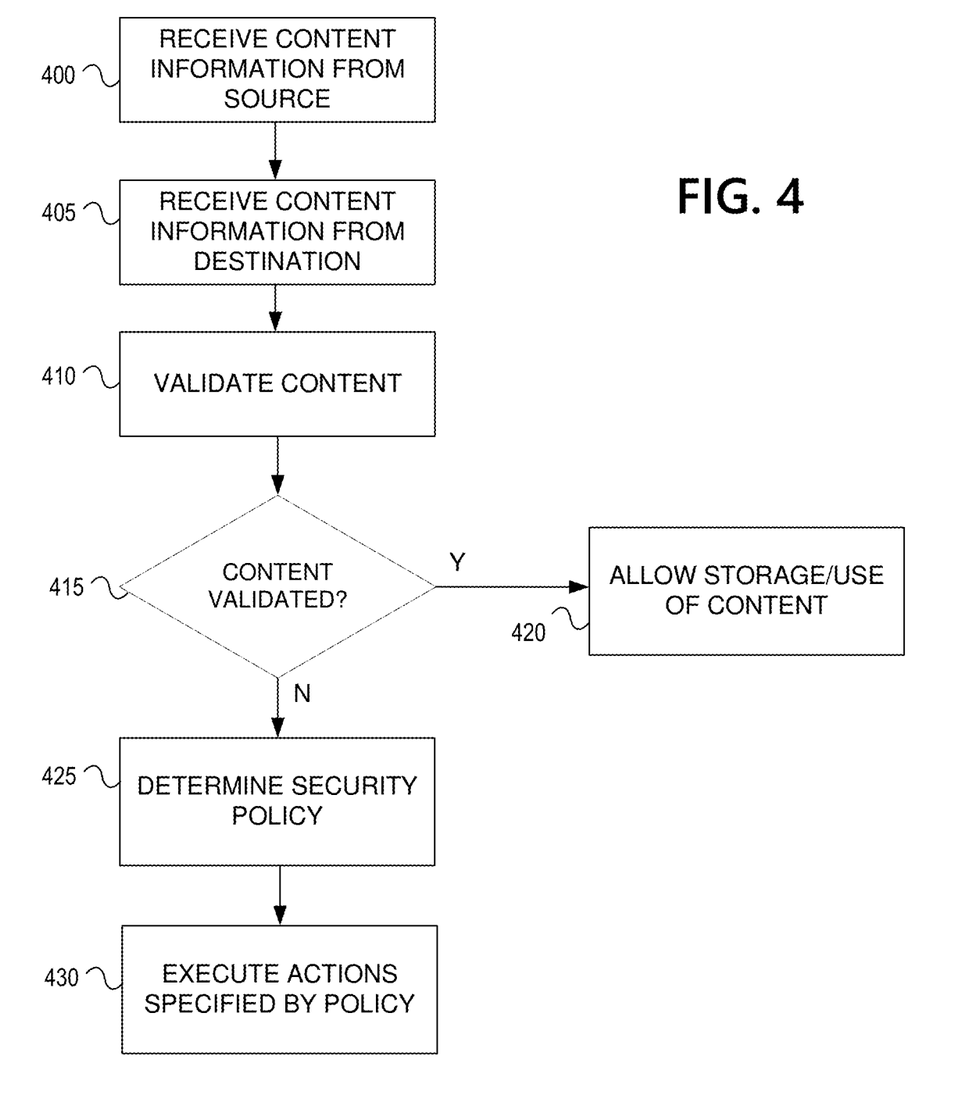
FIG. 4 is a flowchart illustrating an example process by which an analysis server may evaluate data determined through payload detection according to one or more aspects described herein.

FIG. 4 illustrates a process whereby an analysis server or other computing device may receive and process detected and stored data associated with a content transfer. In step 400, the analysis server may receive content transfer information from a content transfer source, while in step 405, the analysis server may receive content transfer information from a content transfer destination. The order in which the information is received may be switched, with the content transfer information from the destination being received before the content transfer information from the source. In any event, the content transfer information may include content attributes such as file name, file size, file extension, encryption type, a hash, time of creation and/or a content creator. Content transfer information may also include data or information associated with the transfer process including a source address, a destination address, prior site or page information, redirection information (count and/or identification), time of download or upload, user associated with the download or upload, and the like and/or combinations thereof.

In step 410, the analysis server may validate the content or content transfer. For example, validation may include confirming that the transferred content is the same at the source as well as the destination. In another example, validation may include confirming that the source or destination are authorized or trusted entities. In yet another example, validation may include confirming that the content adheres to a security or content transfer policy associated with the user and/or an organization. In still other examples, validation may include determining whether the content includes malicious code or is received from a malicious actor. In some arrangements, the analysis may be performed based on information from just one of the source or the destination, and might not require analysis (or receipt) of both sets of information. Based on its analysis of the content and/or associated content data, the analysis server may determine whether the content is validated in step 415.

If the content is validated, the analysis server may allow the use and/or storage of the content by the destination device in step 420. Allowing the use and/or storage of the content may include transmitting a permission message to the destination device in step 420. In other examples, the analysis server may allow a source device to maintain a copy of the content if the content is validated. If, however, the content is not validated, the analysis server may identify a security policy in step 425. The security policy may be specific to a user, an organization, a computing device, a content type and the like and/or combinations thereof. The policy may define actions or functions to be performed if content or a content transfer is not validated. Such actions or functions may include instructing the destination and/or source device to delete the content, sending a notification to an administrator, sending an instruction to the source and/or destination device to lock the device from further user interaction, adding a source or destination to a blocking or filtering list (e.g., at a proxy server) to prevent future communications to or from the destination or source, adding information specific to the content to a filtering or blocking database and the like and/or combinations thereof. Upon identifying the security policy actions or functions to be performed upon determining content is not validated, the analysis server may execute those actions or functions in step 430.

Figure 5:
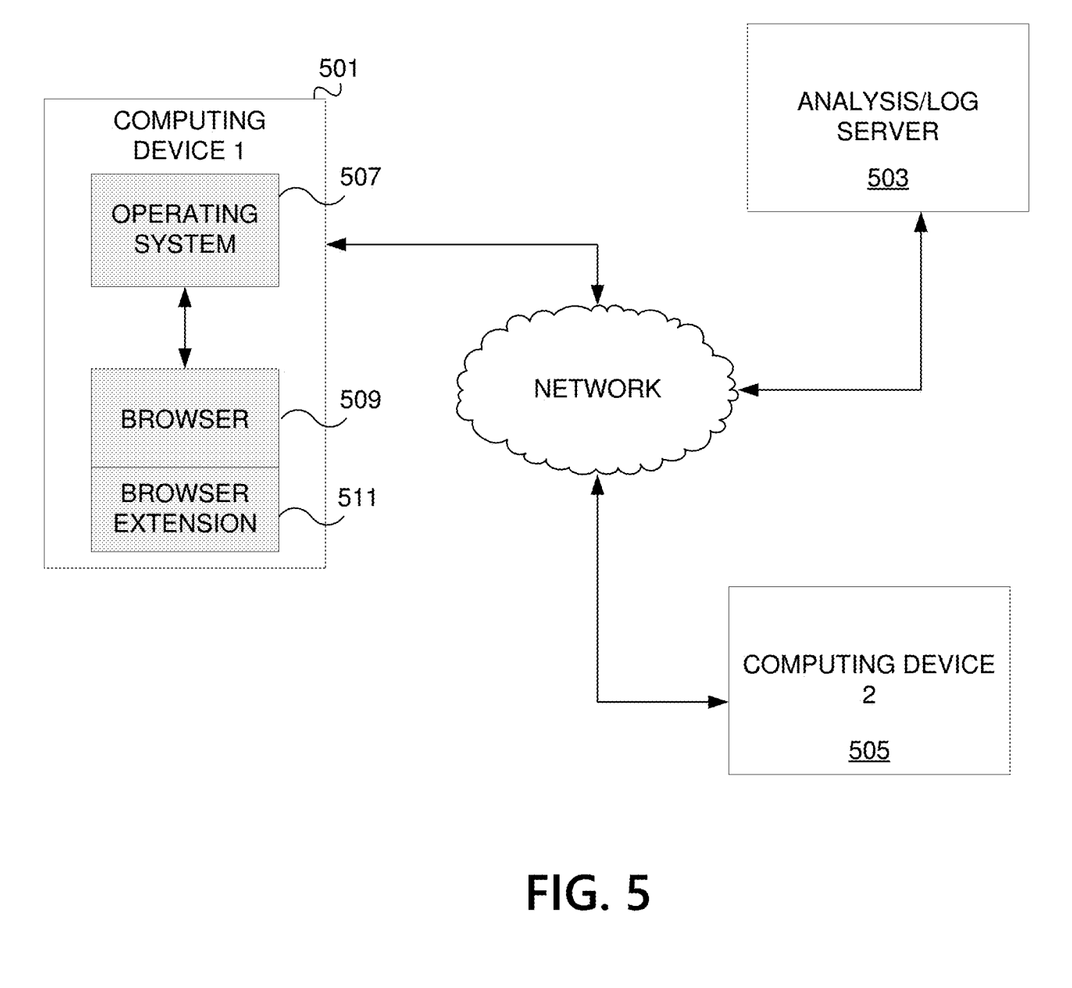
FIG. 5 is a system diagram illustrating an example environment and process for content transfer data detection by a browser extension and processing according to one or more aspects described herein.

FIG. 5 illustrates an example system flow between a first computing device 501, analysis server 503 and a second computing device 505. Computing device 501 may include memory storing instructions for executing and providing an operating system 507 as well as instructions for executing a browser 509 and a browser extension 511. As described, a browser extension 511 may include code or instructions that is executed to add or modify the functionality of an underlying browser application 509. Computing device 501 may be connected to an analysis or log server 503 as well as to another computing device 505 through a network. In some arrangements, computing device 501 and server 503 may be part of the same organization and may be configured to communicate over a private network as well.

Computing device 501 may be configured to execute uploads or downloads of content with computing device 505 through browser application 509. Operating system 507 may be configured to transmit data such as user input, network communications, data from peripherals or other device components, and the like. In some arrangements, operating system 507 may also provide instructions to browser application 509 to restrict or allow certain functions and communications. When a user wishes to use browser application 509, the user may activate the application 509 through the operating system 507. The user may then enter commands or other user input to the browser 509 via the operating system 507.

Browser extension 511 may be automatically executed or launched when browser application 509 is activated. Browser extension 511 may include a content transfer extension that detects upload and/or download requests made through the browser 509 at the computing device 501. Upon detecting an upload or download request, the browser extension 511 may detect and store certain content information or content transfer information for various purposes. In some arrangements, browser extension 511 may detect and store browsing session information prior to a user's upload or download request. For example, browser extension 511 may detect and store pages to which a user has navigated, redirect information, content attributes, timestamps, and the like and/or combinations thereof. This data may be collected and associated with each download or upload request and may further identify a user or entity operating the browser 509 or computing device 501 at the time the download or upload request was made. The collected data may then be transmitted to analysis and log server 503 to undergo further processing. For example, analysis and log server 503 may confirm whether a content source is authorized and/or if the downloaded content was a result of one or more redirects. In some arrangements, a policy may restrict content downloads if the download was a result of some threshold number of redirects (e.g., 1, 2, 4, 5, etc.). Other policies may be implemented by the computing device 501, server 503 and/or an organization associated with the computing device 501 and/or server 503. In some arrangements, corresponding content transfer data may be received from the source or destination device such as device 505. The server 503 may then attempt to correlate the content data and/or content transfer data between the source and the destination to confirm that the content as originally transmitted is the same content as received.

By using the browser extension 511 to detect upload and download requests and subsequently store relevant data, a system may be able to obtain more granular and accurate information associated with a content transfer. In some arrangements, an operating system might not record or analyze every user input or data communication that is sent to and/or through an application such as browser application 509. Accordingly, the operating system or other elements of computing device 501 might not have visibility into redirects or user navigation history or even content attributes that are known at the point of download and upload (e.g., the application layer). Using a browser extension 511 provides more visibility and allows for additional data tracking granularity. For example, in some configurations, the browser extension 511 may define non-traditional or non-standard content or content transfer attributes (e.g., not already defined or required by an operating system or underlying browser) for detection and storage as desired by a user, system, organization or other entity. In another example, generating a hash by the download recipient browser extension may allow for more accurate content verification before the content can be intercepted by other software or code executing on the download recipient's computer or operating system. In some cases, malicious software executing on the recipient's computer may cause a false report that the content is safe to execute or otherwise obscure issues associated with the downloaded content. By validating the content at the browser extension level, such interception and obfuscation may be avoided.

Figure 6:
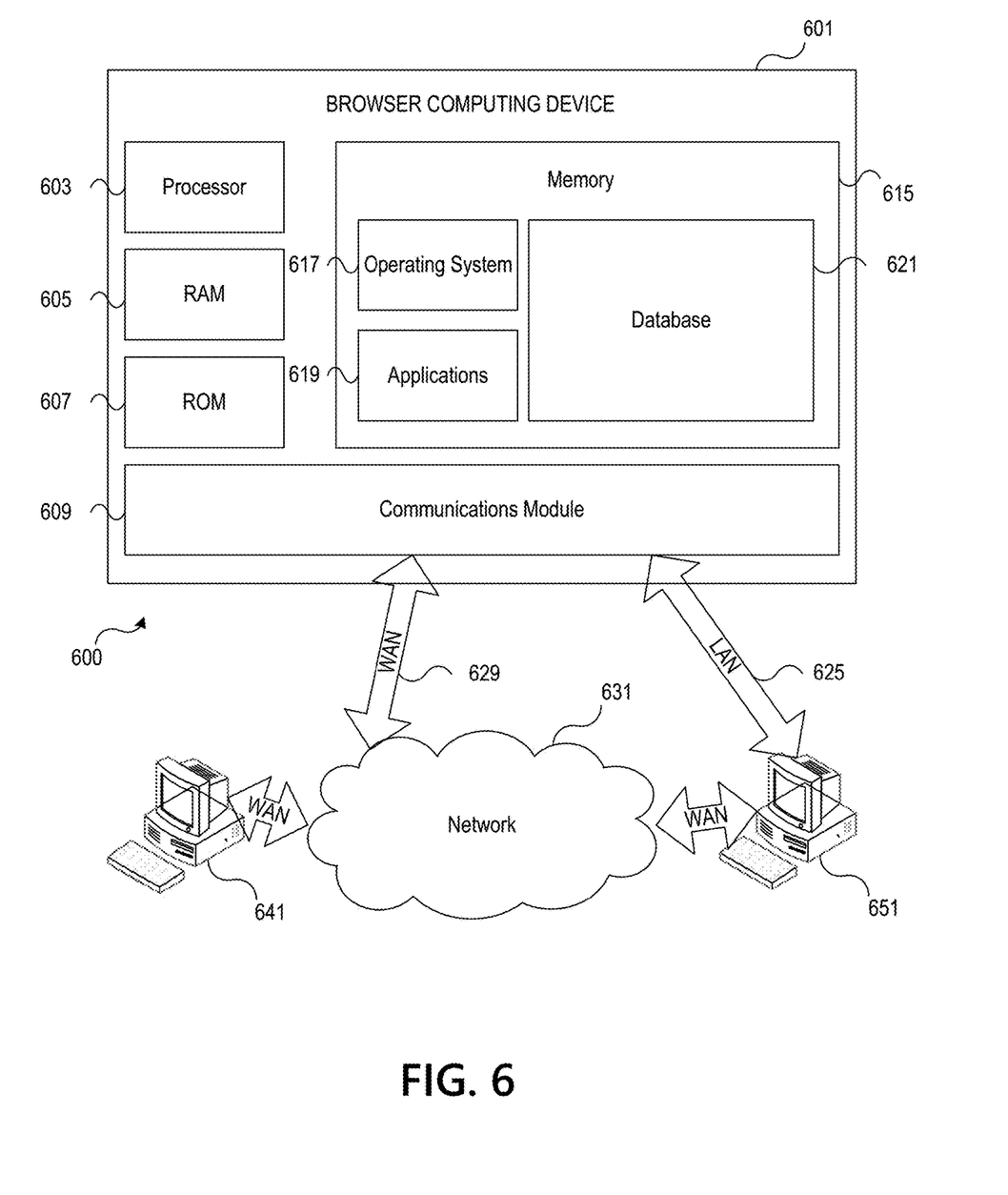
FIG. 6 illustrates an example computing system environment for content transfer detection and data determination by a browser extension according to one or more aspects described herein.

FIG. 6 depicts an illustrative operating environment in which various aspects of the present disclosure may be implemented in accordance with one or more example embodiments. The arrangements described with respect to FIG. 6 may be applied any devices shown and described herein. Referring to FIG. 6, computing system environment 600 may be used according to one or more illustrative embodiments. Computing system environment 600 is only one example of a suitable computing environment and is not intended to suggest any limitation as to the scope of use or functionality contained in the disclosure. Computing system environment 600 should not be interpreted as having any dependency or requirement relating to any one or combination of components shown in illustrative computing system environment 600.

Computing system environment 600 may include browser computing device 601 having processor 603 for controlling overall operation of browser computing device 601 and its associated components, including Random Access Memory (RAM) 605, Read-Only Memory (ROM) 607, communications module 609, and memory 615. Browser computing device 601 may include a variety of computer readable media. Computer readable media may be any available media that may be accessed by browser computing device 601, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by browser computing device 601.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on browser computing device 601. Such a processor may execute computer-executable instructions stored on a computer-readable medium.

Software may be stored within memory 615 and/or storage to provide instructions to processor 603 for enabling browser computing device 601 to perform various functions as discussed herein. For example, memory 615 may store software used by browser computing device 601, such as operating system 617, application programs 619, and associated database 621. Also, some or all of the computer executable instructions for browser computing device 601 may be embodied in hardware or firmware. Although not shown, RAM 605 may include one or more applications representing the application data stored in RAM 605 while browser computing device 601 is on and corresponding software applications (e.g., software tasks) are running on browser computing device 601.

Communications module 609 may include a microphone, keypad, touch screen, and/or stylus through which a user of browser computing device 601 may provide input, and may also include one or more of a speaker for providing audio output and a video display device for providing textual, audiovisual and/or graphical output. Computing system environment 600 may also include optical scanners (not shown).

Browser computing device 601 may operate in a networked environment supporting connections to one or more remote computing devices, such as computing devices 641 and 651. Computing devices 641 and 651 may be personal computing devices or servers that include any or all of the elements described above relative to browser computing device 601.

The network connections depicted in FIG. 6 may include Local Area Network (LAN) 625 and Wide Area Network (WAN) 629, as well as other networks. When used in a LAN networking environment, browser computing device 601 may be connected to LAN 625 through a network interface or adapter in communications module 609. When used in a WAN networking environment, browser computing device 601 may include a modem in communications module 609 or other means for establishing communications over WAN 629, such as network 631 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A method for detecting content transfers through a browser application, the method comprising:
   executing, by the browser application, a data transfer extension associated with the browser application;
   determining, by the browser application using the data transfer extension, data associated with user interactions with one or more sites visited using the browser application;
   detecting, by the browser application using the data transfer extension, a user instruction to transfer content comprising redirection data which further comprises at least one unexpected redirection to or from a remote network location;
   initiating, by the browser application, a transfer of the content to or from the remote network location;
   storing, by the browser application using the data transfer extension, the determined data in association with a record of the content transfer, wherein the determined data comprises one or more content pages accessed by the browser application prior to detecting the user instruction to transfer content comprising redirection data, a hash of the content at the remote network location, and a hash of the content at a destination of the content transfer; and
   transmitting the determined data in association with the record of the content transfer to an analysis server, wherein the analysis server validates the determined data of the content transfer based on validating at least one of a source or the destination of the content transfer, comparing the redirection data to a redirection threshold and determining the redirection data is less than the redirection threshold, and comparing the hash of the content at the remote network location and the hash of the content at the destination of the content transfer and determining the hash of the content at the remote network location matches the hash of the content at the destination of the content transfer.

2. The method of claim 1, further comprising:
   in response to transmitting the determined data, receiving one or more instructions from the analysis server; and
   performing one or more functions on the transferred content based on the received one or more instructions.

3. The method of claim 2, wherein the one or more instructions include deleting the transferred content.

4. The method of claim 2, wherein the one or more instructions include preventing the user from accessing the transferred content by adding the remote network location or the destination to a blocking list.

5. The method of claim 2, wherein the one or more instructions include locking the user out of a computing device on which the browser application is executed.

6. The method of claim 1, wherein the browser application navigates to at least one prior site before navigating to a site through which the user instruction to transfer content is detected, and
   wherein the determined data includes an identifier associated with the prior site.

7. The method of claim 6, wherein the prior site includes code automatically redirecting the browser application to the site through which the user instruction to transfer content is detected.

8. The method of claim 1, wherein the determined data comprises a hash of the content at an intermediary proxy server which receives the user instruction from the remote network location, and wherein the hash of the content at the intermediary proxy server is compared to the hash of the content at the remote network location and the hash of the content at the destination of the content transfer.

9. An apparatus comprising:
   a processor; and
   memory storing computer-readable instructions that, when executed by the processor, cause the apparatus to:
      execute, by a browser application, a data transfer extension associated with the browser application;
      determine, by the browser application using the data transfer extension, data associated with user interactions with one or more sites visited using the browser application;
      detect, by the browser application using the data transfer extension, a user instruction to transfer content comprising redirection data which further comprises at least one unexpected redirection to or from a remote network location;
      initiate, by the browser application, a transfer of the content to or from the remote network location;
      store, by the browser application using the data transfer extension, the determined data in association with a record of the content transfer, wherein the determined data comprises one or more content pages accessed by the browser application prior to detecting the user instruction to transfer content comprising redirection data, a hash of the content at the remote network location, and a hash of the content at a destination of the content transfer; and
      transmit the determined data in association with the record of the content transfer to an analysis server, wherein the analysis server validates the determined data of the content transfer based on validating at least one of a source or the destination of the content transfer, comparing the redirection data to a redirection threshold and determining the redirection data is less than the redirection threshold, and comparing the hash of the content at the remote network location and the hash of the content at the destination of the content transfer and determining the hash of the content at the remote network location matches the hash of the content at the destination of the content transfer.

10. The apparatus of claim 9, wherein the computer-readable instructions further cause the apparatus to:
    in response to transmitting the determined data, receive one or more instructions from the analysis server; and
    perform one or more functions on the transferred content based on the received one or more instructions.

11. The apparatus of claim 10, wherein the one or more instructions include deleting the transferred content.

12. The apparatus of claim 10, wherein the one or more instructions include preventing the user from accessing the transferred content by adding the remote network location or the destination to a blocking list.

13. The apparatus of claim 9, wherein the one or more instructions include locking the user out of a computing device on which the browser application is executed.

14. The apparatus of claim 9, wherein the browser application navigates to at least one prior site before navigating to a site through which the user instruction to transfer content is detected, and
   wherein the determined data includes an identifier associated with the prior site.

15. The apparatus of claim 14, wherein the prior site includes code automatically redirecting the browser application to the site through which the user instruction to transfer content is detected.

16. A non-transitory computer-readable medium storing computer-readable instructions that, when executed, cause a computing device to:
   execute, by a browser application executing on the computing device, a data transfer extension associated with the browser application;
   determine, by the browser application using the data transfer extension, data associated with user interactions with one or more sites visited using the browser application;
   detect, by the browser application using the data transfer extension, a user instruction to transfer content comprising redirection data which further comprises at least one unexpected redirection to or from a remote network location;
   initiate, by the browser application, a transfer of the content to or from the remote network location;
   store, by the browser application using the data transfer extension, the determined data in association with a record of the content transfer, wherein the determined data comprises one or more content pages accessed by the browser application prior to detecting the user instruction to transfer content comprising redirection data, a hash of the content at the remote network location, and a hash of the content at a destination of the content transfer; and
   transmit the determined data in association with the record of the content transfer to an analysis server, wherein the analysis server validates the determined data of the content transfer based on validating at least one of a source or the destination of the content transfer, comparing the redirection data to a redirection threshold and determining the redirection data is less than the redirection threshold, and comparing the hash of the content at the remote network location and the hash of the content at the destination of the content transfer and determining the hash of the content at the remote network location matches the hash of the content at the destination of the content transfer.

17. The non-transitory computer-readable medium of claim 16, wherein the computer-readable instructions further cause the computing device to:
   in response to transmitting the determined data, receive one or more instructions from the analysis server; and
   perform one or more functions on the transferred content based on the received one or more instructions.

18. The non-transitory computer-readable medium of claim 16, wherein the browser application navigates to at least one prior site before navigating to a site through which the user instruction to transfer content is detected, and
   wherein the determined data includes an identifier associated with the prior site.

19. The non-transitory computer-readable medium of claim 18, wherein the prior site includes code automatically redirecting the browser application to the site through which the user instruction to transfer content is detected.

20. The non-transitory computer-readable medium of claim 16, wherein the determined data comprises a hash of the content at an intermediary proxy server which receives the user instruction from the remote network location, and wherein the hash of the content at the intermediary proxy server is compared to the hash of the content at the remote network location and the hash of the content at the destination of the content transfer.

* * * * *